Patent Number: 5,256,476
Date of Patent: Oct. 26, 1993

United States Patent [19]
Tanaka et al.

[54] FAN BLADE COMPRISING ADSORBENT PARTICLES, FINE PLASTIC PARTICLES AND REINFORCING FIBERS

[75] Inventors: Eiji Tanaka; Ken Tanii, both of Okayama; Yohichi Fujii, Tsukubo, all of Japan

[73] Assignee: Kuraray Chemical Co., Ltd., Bizen, Japan

[21] Appl. No.: 974,835

[22] Filed: Nov. 16, 1992

Related U.S. Application Data

[63] Continuation of Ser. No. 606,955, Oct. 31, 1990, abandoned.

[30] Foreign Application Priority Data

| Date | Country | Number |
|---|---|---|
| Nov. 2, 1989 [JP] | Japan | 1-287179 |
| Aug. 14, 1990 [JP] | Japan | 2-215239 |
| Oct. 15, 1990 [JP] | Japan | 2-277116 |

[51] Int. Cl.$^5$ .................. B32B 5/16; B01D 39/00; B63H 1/26
[52] U.S. Cl. ................ 428/241; 55/524; 55/522; 416/230; 416/241 R; 428/244; 428/245; 428/283; 95/107; 95/901; 96/125
[58] Field of Search ............... 416/223 R, 229 R, 230, 416/241 R, 241 A; 428/245, 253, 255, 281, 288, 241, 244, 283; 55/74, 522, 527, 524, 316, 387

[56] References Cited

U.S. PATENT DOCUMENTS

| | | | |
|---|---|---|---|
| 2,272,746 | 2/1942 | Holm-Hansen | 416/230 |
| 3,474,600 | 10/1969 | Tobias | 55/524 |
| 3,538,020 | 11/1970 | Heskett et al. | 55/387 |
| 3,611,678 | 10/1971 | Holden | 55/387 |
| 3,645,072 | 2/1972 | Clapham | 55/524 |
| 3,721,072 | 3/1973 | Clapham | 55/524 |
| 3,859,162 | 1/1975 | Johnson et al. | 428/318.6 |
| 4,061,807 | 12/1977 | Shaler | |
| 4,186,101 | 1/1980 | Reinhardt | 55/528 |
| 4,720,244 | 1/1988 | Kloppel et al. | 416/230 |
| 4,868,038 | 9/1989 | McCullough, Jr. et al. | 428/253 |

FOREIGN PATENT DOCUMENTS 0159696 10/1985 European Pat. Off. .
896345 5/1962 United Kingdom .

*Primary Examiner*—George F. Lesmes
*Assistant Examiner*—James D. Withers
*Attorney, Agent, or Firm*—Oblon, Spivak, McClelland, Maier & Neustadt

[57] ABSTRACT

Provided are molded adsorbents comprising a mixture of adsorbent particles, fine plastic particles and a reinforcing fiber, the mixture having been molded utilizing the fine plastic particles and, as required, the reinforcing fiber as binder. They have features, as compared with conventional molded adsorbents utilizing a latex binder, having an adsorptive capacity having been decreased to a smaller extent from those of the raw material adsorbent particles used and higher adsorption rate owing to well-maintained porosity. They have good mechanical properties at normal temperature and can hence be processed by cutting or like machinings into various machine parts, including blades of fans having both adsorptive capacity and high mechanical properties. Also provided are a process for producing the above molded adsorbents and their use as deodorizing units.

2 Claims, 2 Drawing Sheets

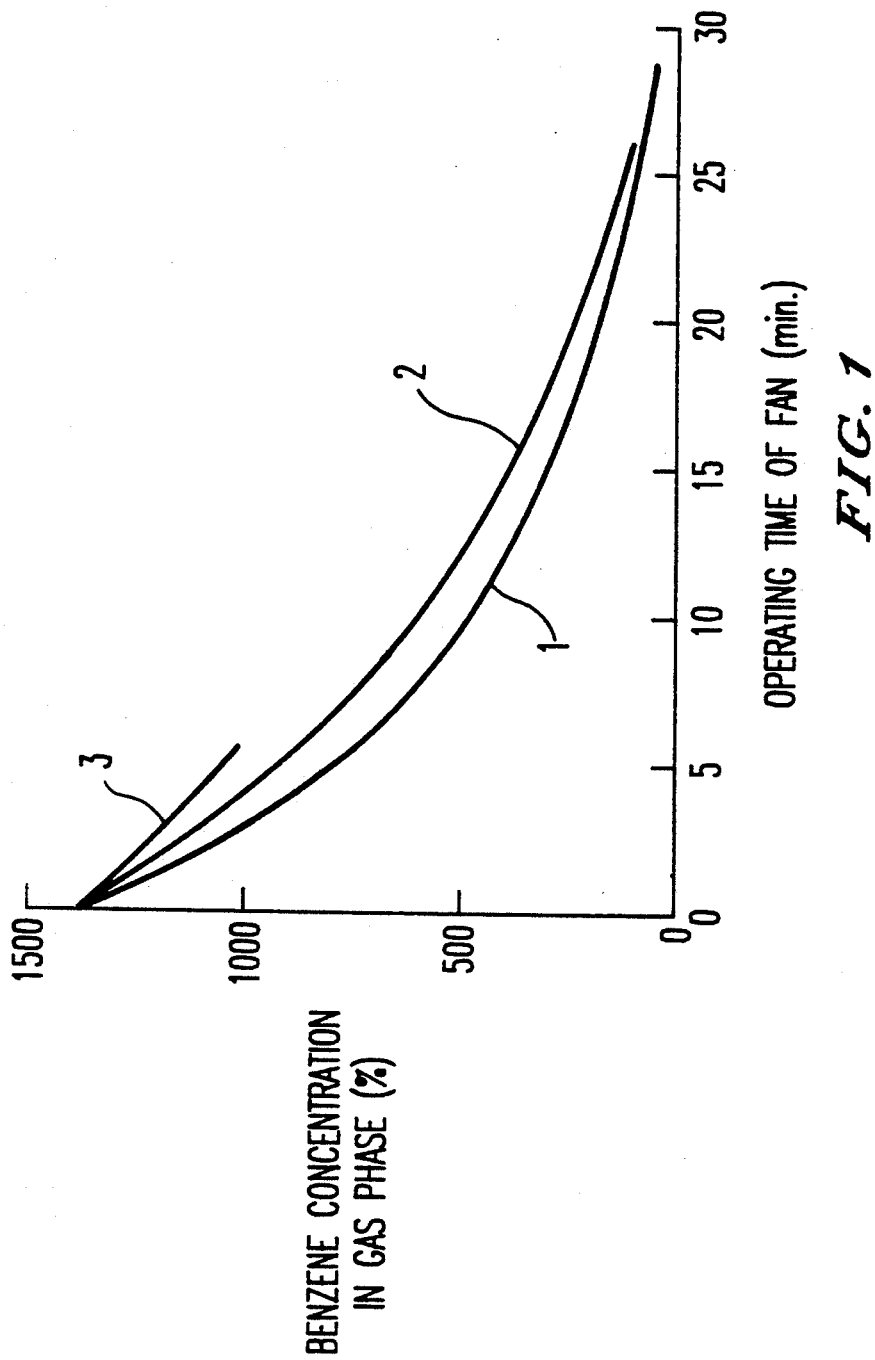

FAN BLADE COMPRISING ADSORBENT PARTICLES, FINE PLASTIC PARTICLES AND REINFORCING FIBERS

This application is a continuation of application Ser. No. 07/606,955, filed on Oct. 31, 1990, now abandoned.

BACKGROUND OF THE INVENTION

The present invention relates to molded adsorbents, and more specifically to molded articles comprising adsorbents and a small amount of binder and having high strength and large adsorptive capacity.

Various molding processes are known for the purpose of producing molded articles comprising adsorbents. Most of the processes apply to activated carbon as an adsorbent and comprise using coal tar or pitch as a binder and molding the mixture. Molded adsorbents obtained by these processes however have markedly decreased absorptive capacity since the binder covers the surface of activated carbon. It therefore becomes necessary to first mold a mixture of the binder with a raw material of activated carbon and then submit the molded article to activation treatment to obtain activated carbon. Although this is a complex process and has a drawback that the finished molded products obtained by this process tend to be deformed, these products have excellent mechanical properties and are hence frequently used for honeycomb-shaped adsorbents having complex structures.

A process comprising the use of a latex as binder has, in recent years, also been applied to various adsorbents. This process has an advantage in that granules or particles of the adsorbent used can be molded to directly give a usable molded adsorbent. However, it has been pointed out that the molded adsorbent thus prepared have some problems of considerable reduction in the absorptive capacity and in that they are relatively soft and have not so high mechanical properties.

Conventional deodoring units used for air cleaners and air conditioners are generally so constructed that a filter previously formed of an adsorbent is fitted in the front of the body, through which filter air is passed by a fan to be deodored. This system has, in the case where a large amount of air is flown therethrough, drawbacks of large pressure loss, high noise level caused by the motor and fan used and high electricity cost.

If a fan itself can be molded from a mixture containing an adsorbent, to be provided with both air blowing function and deodoring function, there will be provided an deodoring apparatus requiring no stationary deodoring unit and causing only small pressure loss, low noise and low power consumption.

Although attempts have been made to mold an adsorbent into a fan shape, no deodoring fans withstanding high-speed rotation and having large absorptive capacity have ever been obtained. An increased amount of a binder is required for obtaining a fan with high strength, whereby the absorptive capacity decreased significantly and such a fan can hardly be put in practical use. Furthermore, water-soluble binder such as carboxymethylcellulose have been used in most of the attempts for this purpose, which causes the obtained blades for fans to be soft, being unable to withstand high-speed revolution, and to have only small adsorptive capacity.

SUMMARY OF THE INVENTION

An object of the present invention is to provide a molded adsorbent having an adsorptive capacity and rate of adsorption having been decreased only to a small extent from those of the raw material adsorbent used and excellent mechanical properties.

Another object of the present invention is to provide a process for producing the above molded adsorbent.

Still another object of the present invention is to provide the use of the above molded adsorbent.

The largest problem in the molding of adsorbents is how to prevent their adsorptive capacity from decreasing by the molding operation. The molded adsorbent of the present invention utilizes a particulate plastic binder instead of conventional latex binders. Molded adsorbents utilizing a particulate plastic binder have advantages of, besides smaller binder consumption, smaller decrease in adsorptive capacity and higher adsorption rate as compared with those utilizing a latex binder, because of smaller area of adhesion by fusion between the plastic particles and adsorbent particles and that among plastic particles themselves, which little impairs the porosity.

Polyethylene and polypropylene are suited as the particulate plastic binder, but other particulate plastics can also well maintain considerably high hardness of the obtained molded adsorbents at normal temperature. These molded adsorbents are therefore machinable and can be formed into machine parts with high precision.

The molded adsorbents of the present invention can, utilizing the above characteristics, be processed into machine parts with excellent adsorptive capacity and mechanical properties, such as blades of fans used for air conditioners, air cleaners and deodorizing units and honeycomb adsorbents with high dimensional precision.

BRIEF DESCRIPTION OF THE DRAWING

A more complete appreciation of the invention and many of the attendant advantages thereof will be readily obtained as the same become better understood by reference to the following detailed description when considered in connection with the accompanying drawing, wherein:

FIG. 1 shows the relationship between benzene concentration in the gas phase and the operating time of fans with the blades prepared according to the present invention where curves 1, 2 and 3 represent results obtained in Example 9 and Comparative Examples 5 and 6, respectively; and FIGS. 2A-2D show the honeycomb-shaped molded articles obtained in Example 11 wherein FIG. 2A is a perspective view and FIGS. 2B, 2C and 2D are plan views wherein 1 represents honeycomb holes and 2 molded article.

DETAILED DESCRIPTION OF THE PREFERRED EMBODIMENTS

Figure 2A:
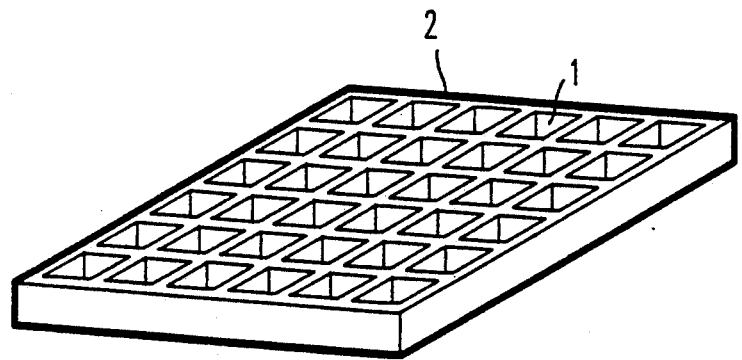

As a result of an intensive study made by the present inventors, for the purpose of obtaining molded adsorbents with excellent mechanical properties, to mold adsorbent particles with a binder of plastic particles, the inventors found the following facts to complete the invention:

a. The use of plastic particles in a small amount as a binder can give a molded article having excellent mechanical properties and well maintained absorptive capacity; and b. The obtained molded article keeps porosity and high adsorption rate, since the fusion between the plastic particles and adsorbent particles and that among plastic particles themselves occur only on limited parts of the particle surfaces. (The term "adsorptive capacity" herein means an adsorption at equilibrium and "adsorption rate" an amount adsorbed in a unit time.)

Thus, the present invention provides (1) a molded adsorbent comprising a mixture of adsorbent particles wherein said adsorbent particles are at least one member selected from the group consisting of activated carbon, zeolite and silica; fine plastic particles wherein said fine plastic particles are at least one member selected from the group consisting of polyethylene, polypropylene, ethylene-vinyl acetate copolymer and its derivatives, and the principal component particles thereof have a particle diameter of 0.5 to 100 μm, blended ratio of 1 to 50 parts by weight based on 100 parts by weight of the adsorbent particles; and a reinforcing fiber; said mixture being consolidated by action of said fine plastic particles and said reinforcing fiber as binder.

Preferred reinforcing fibers used in the invention are at least one member selected from organic fibers, such as polyethylene terephthalate, polybutylene terephthalate, nylon, polyvinyl alcohol, Kevlar®, polyethylene, polypropylene and conjugate fibers comprising at least two of the foregoing; and inorganic fibers, such as glass fiber. These fibers are used in the form of individual short-cut filaments or fiber chips; chopped strands; nonwoven, woven or knitted fabric; net or like forms. Preferred shapes of the molded article are blades of propeller-type fan or sirocco fan, honeycombs, plates and sheets.

The present invention further provides (2) a process for producing molded adsorbents which comprises molding a mixture of adsorbent particles, fine plastic particles and a reinforcing fiber by fusing the fine plastic particles and, if necessary, the reinforcing fiber.

The present invention still further provides (3) the use of a molded adsorbent as a deodorizing unit, the molded adsorbent being obtained by molding a mixture comprising adsorbent particles, fine plastic particles and a reinforcing fiber, utilizing the fine plastic particles and, as required, the reinforcing binder as binder.

Hereinbelow the present invention is described in more detail.

Any adsorbent can be used in the present invention as long as it has a large surface area of several 100 m² or more per gram such as activated carbon and exhibits high adsorbing performance. Adsorbents having the above characteristics are also excellent in the function of removing unpleasant odor from the air. Preferred among these are activated carbon, zeolite and silica.

The term "silica" herein means, besides silica gel, silicates containing at least one metal selected from the group consisting of silver, aluminum, titanium, vanadium, chromium, manganese, iron, cobalt, nickel, tin, copper, zinc, cadmium and lead.

The zeolite herein include natural zeolites and synthetic zeolites.

The adsorbent particles used can be of any shape, such as fragments, pellets, granules, filaments, felt-like, textile-like or sheets, the latter three plane shapes being also included in the term "adsorbent particles" herein.

There no particular restrictions with respect to the particle size of the raw material adsorbent particles used in the invention, those particles having an average particle diameter of 0.1 μm to 1.0 mm can be used. It is however preferred that the average particle size be, for the purpose of maintaining high adsorption rate, 0.1 to 200 μm, to be selected depending on the intended use though. Besides the above, pelletized particles having a diameter of 3 to 4 mm are also preferable, and further the above plane-shape adsorbents may also be used.

Usable plastics in the present invention are at least one member selected from polyethylene, polypropylene, ethylene-vinyl acetate copolymer and its derivatives, such as ethylene-vinyl acetate-vinyl chloride copolymer and denaturated ethylene-vinyl acetate copolymer.

The average particle size of the plastic particles used is preferably in the range of from 0.1 to 100 μm. If the average particle size is less than 0.1 μm, the molded article will tend to show a little decreased strength. Then, it becomes necessary, for the purpose of maintaining the strength above a desired level, to increase the amount of the plastic particles blended, whereby clearances between the adsorbent particles are clogged with the plastic particles to cause the adsorption rate to decrease a little.

On the other hand, if the average particle size exceeds 100 μm, the effect of adhering the particles to the surfaces of adsorbent particles by electostatic force (see explanation given hereinlater), will not be fully produced, whereby it becomes necessary to add at least 50 parts by weight of the plastic particles in order to maintain the strength of the molded article and the adsorptive capacity must then decrease. More preferably, the average particle size is 1 to 50 μm.

The ratio of the plastic particles to adsorbent particles used is preferably in the range of from 1 to 50 parts by weight of the plastic based on 100 parts by weight of the adsorbent. To summarize, it is preferred that the plastic particles used in the present invention have an average particle size of 0.1 to 100 μm and be blended in a ratio of 1 to 50 parts by weight based on 100 parts by weight of the adsorbent particles used.

If plastic particles are blended in an amount of not more than 1 part by weight, the molded article, for example a fan blade, will have a little low strength and fans with very long such blades or rotating at a very high speed will have very small allowance for strength. In the present invention, the blending ratio of plastic particles is, while depending on the particle size and specific gravity of the adsorbent particles used, more preferably 2 to 30 parts by weight based on the weight of the adsorbent particles; and in most cases, generally, a blending ratio of 3 to 20 parts by weight on the same basis provides the obtained molded article with sufficient strength. It is most preferred that the blending ratio of the plastic particles be as small as possible within this range, thereby preventing the adsorption rate and adsorptive capacity from decreasing.

Any reinforcing fiber can be used in the invention, including inorganic and organic fibers, and in the forms of individual fiber chips, chopped strands, endless yarns or rovings, woven, knit or nonwoven fabrics, net or the like. Preferred fibers are polyethylene, polypropylene, polyesters, nylon, polyvinyl alcohol, Kevlar, and conjugate fibers comprising at least two of the foregoing, such as polyester-polyethylene, and inorganic fibers such as glass fiber.

In the present invention, the diameter and length of the reinforcing fiber are not specifically limited and fibers with a wide variety of diameters and lengths can produce effects of increasing the strength of molded articles. It is however preferred, when a fiber is used in the form of short-cut chips, that the diameter and the length be 0.2 to 50 μm and 0.5 to 5 mm respectively, more preferably 1.0 to 20 μm and 1.0 to 3.0 mm respectively.

The ratio of the amount of the reinforcing fiber to that of adsorbent particles is not specifically limited and a wide variety of the blending ratio can produce the effect of increasing the strength of the molded articles. It is however preferred that the ratio be 0.1 to 5 parts by weight based on 100 parts by weight of the adsorbent particles used, preferably 1 to 3 parts by weight based on the same basis. With increasing amount of the reinforcing fiber blended, the strength of molded articles increases but the adsorptive capacity decreases. It is necessary to use a reinforcing fiber in a minimal amount meeting the requirements of the intended use.

In blending the components, where a short-cut reinforcing fiber is used, the short-cut fiber chips are blended with adsorbent particles previously coated with plastic fine particles; the fiber chips, fine plastic particles and adsorbent particles are mixed at the same time, or like blending procedures may be followed.

The blending can be conducted with any known apparatus, such as mixer, ribbon mixer, static mixer, ball mill, sample mill or kneader.

Where a reinforcing fiber in the form of a woven, nonwoven or knit fabric or net is used, for example plastic particles and adsorbent particles are first blended as above and the reinforcing fabric or net is, upon molding, applied on one side or both sides of the blend, or laid inside the blend. Where it is wished to use an inorganic reinforcing fiber also as a binder, for example a glass fiber net may be laminated or coated with polyethylene or like thermoplastic resins and used.

While solely mechanical blending can adhere plastic particles to adherent particles, blending under heating can provide still more solid adherence. In this case, preferred heat sources are those emitting heat rays that can be absorbed efficiently by the plastic particles used, such as microwave, infrared rays, far infrared rays and high frequency wave.

During the blending, static electricity generates between adsorbent particles and fine plastic particles, thereby adhering each other. This effect together with the effect of blending can achieve adhesion of plastic particles, while distributing them more uniformly, to the surfaces of adsorbent particles and, when a short-cut fiber is blended together, to those of the short-cut fiber chips.

The blend thus prepared is molded by a known process, such as one using a belt press or heat press, or injection molding. At this time, only plastic particles, or both plastic particles and reinforcing fiber, are fused to act as binder by properly selecting their materials and molding conditions. Furthermore, the proper selection can realize adhesion by fusion of only parts of the plastic particles and fiber used, or only parts of the plastic particles alone, i.e. fusion at only contact points between particles.

The blend may be molded into any desired shape such as a flat plate, which is then cut to strips to be processed into flat filters, a blade of propeller fans or sirocco fans, or the like. The blend may also be injection molded into entire blades of fans. In molding blades for fans, injection molding is preferred because of high productivity and the moments of inertia of obtained blades being the same.

Adsorptive fans provided with the blade obtained according to the present invention have the features of high adsorption performance because of their ability to withstand high-speed rotation and low noise and power cost because of low pressure loss. Furthermore, they can be used for a long time period because of large adsorptive capacity.

These adsorptive fans can therefore be used in a wide variety of end-uses. For example, when housed in air cleaners and air conditioners, the adsorptive fans can cause them to generate low noise and be enjoy low running cost, since they have high adsorption performance and cause low pressure loss.

The molded adsorbent of the present invention, utilizing a particulate plastic binder, has far higher mechanical properties than those using a latex binder since plastic particles have considerably higher strength and hardness than cured latex binder, and can hence be of complex shapes or be further machined by cutting or the like into machine parts having adsorptive capacity, i.e. multifunctional machine parts.

As described before, a proper selection of the materials of the plastic particles and reinforcing fiber used, and the molding conditions, the obtained molded article can be consolidated by fusion at only contact points between the particles and,. if so selected, the reinforcing fiber. The contact points occupy only a very small part of the surfaces of the particles and fiber mass used, whereby the inside of the molded article is of highly porous structure.

It is true that molded adsorbents utilizing a latex binder also has a porous structure, since the adhesion between adsorbent particles occurs at only part of their surfaces. However, molded adsorbents utilizing a particulate plastic binder of the present invention have far more developed porous structure than that of molded adsorbents utilizing a latex binder, because the plastic particles have larger size than particles present in the latex and because the plastic particles will not be crushed and act as spacers.

Accordingly, the molded adsorbents of the present invention suffer only a little a decrease in the adsorptive capacity caused by molding operation from that of the raw material adsorbent particles used and have highly developed porous structure, and are hence characterized by their high adsorptive rate.

Other features of the invention will become apparent in the course of the following descriptions of exemplary embodiments which are given for illustration of the invention and are not intended to be limiting thereof.

EXAMPLES

Example 1

A blend was prepared by mixing with heating 3 parts by weight of polyethylene particles having an average diameter of 25 μm to 100 parts by weight of activated carbon particles having a particle size distribution of 10 to 30 meshes, to adhere the fine polyethylene particles on the surfaces of the activated carbon particles.

A bottomless square mold having a size of 10 cm × 20 cm and a depth of 5 mm was placed on a polypropylene monofilament net. The activated carbon particles having the fine polyethylene particles thereon prepared above were filled in the mold and a polyethylene monofilament net was laid on them. The entire block was molded under a pressure of 1 kg/cm$^2$ and at a temperature of 120° C. to give a plate-shaped adsorbent filter.

The adsorbent filter thus obtained was tested for the fracture strength by 3-point support method, to give 100 kg/cm$^2$.

Comparative Example 1

Example 1 was repeated except that the polypropylene net and polyethylene net were not used, to obtain a plate-shaped adsorbent filter.

The adsorbent filter thus obtained was tested for the fracture strength by 3-point support method, to give 5 kg/cm$^2$.

Example 2

A round rod having a diameter of 25 mm and wrapped with a net of ethylene-vinyl acetate copolymer monofilament was placed at the center of a hollow cylindrical mold having an inside diameter of 60 mm. A mixture of 100 parts by weight of zeolite having an average particle diameter of 100 μm and 3 parts by weight of polypropylene particles having an average particle diameter of 30 μm was filled between the rod and the inner wall of the cylinder and then molded by heating at 130° C. After being allowed to cool, the cylindrically molded article was taken out, and wrapped with a thermo-shrinkable nonwoven fabric around its outer circumpherence. The thus wrapped article was again heated to give a cylindrical adsorbent filter.

The filter thus obtained was submitted to a compression test by applying radial force, to give 70 kg/cm$^2$.

Comparative Example 2

Example 2 was repeated except that the original molded article was not reinforced with the thermo-shrinkable nonwoven fabric, to obtain a cylindrical adsorbent filter.

The filter thus obtained was submitted to a compression test by applying radial force, to give 7 kg/cm$^2$.

Example 3

A rectangular parallelepiped block having a size of 10 cm×20 cm×5 cm was formed from a mixture of 100 parts by weight of activated-carbon pellets having a diameter of 4 mm and 3 parts by weight of fine polymethyl methacrylate prepolymer particles having an average diameter of 40 μm.

The block was wrapped with a nonwoven fabric made of a thermoplastic fiber and then heated in a mold to give a rectangular parallelepiped adsorbent filter.

The adsorbent filter thus obtained showed a fracture strength of 80 kg/cm$^2$.

Comparative Example 3

Example 3 was repeated except that reinforcement with the nonwoven fabric was not conducted, to obtain a rectangular parallelepiped adsorbent filter.

The adsorbent filter thus obtained showed a fracture strength of 10 kg/cm$^2$.

Example 4

A blend was prepared by mixing 100 parts by weight of activated carbon pellets having a diameter of 4 mm and 3 parts by weight of fine polyethylene particles having an average diameter of 20 μm. In the blend, the fine polyethylene particles adhered to the surfaces of the carbon pellets.

The blend was sandwiched in a mold between a pair of glass fiber nets of 10 mesh each coated with a polyethylene film having a thickness 1/50 that of the net. The composite body was molded under a pressure of 5 kg/cm$^2$ and at 120° C. to give an adsorbent filter plate having a size of 10 cm×20 cm×10 mm.

The adsorbent filter thus obtained showed a fracture strength of 80 kg/cm$^2$.

Comparative Example 4

Example 4 was repeated except that the glass fiber nets were not used, to obtain an adsorbent filter plate.

The adsorbent filter thus obtained showed a fracture strength of 3 kg/cm$^2$.

It is seen from the above Examples and Comparative Examples that the adsorbent filters obtained according to the present invention had markedly high fracture strengths.

Example 5

A mixture was prepared by blending well in a V-type blender 30 parts by weight of monodispersion activated carbon powder A having a median particle size of 30 μm and a weight fraction of particles of 12 to 80 μm diameter of 80%, 70 parts by weight of monodispersion activated carbon particles B having a median particle size of 100 μm and a weight fraction of particles of 40 to 200 μm diameter of 75%, 10 parts by weight of a polyethylene powder having an average particle diameter of 20 μm and 2 parts by weight of 2-mm cut polyester fiber chips. The mixture was placed in a mold having a thickness of 2 mm and compression molded under a pressure of 2 kg/cm$^2$ and at 120° C.

The molded activated carbon plate thus obtained was tested for compressive strength, equilibrium adsorption and adsorption rate. The results are shown in Table 1.

The term "monodispersion" herein means, in a distribution of particle size, a dispersion in which all the particle sizes are contained in the range of from $R^{0.60}$ to $R^{1.4}$ μm where R represents the median particle diameter in μm.

Example 6

A mixture was prepared by blending well in a V-type blender 30 parts by weight of monodispersion activated carbon powder A having a median particle size of 10 μm and a weight fraction of particles of 5 to 30 μm diameter of 80%, 70 parts by weight of monodispersion activated carbon particles B having a median particle size of 80 μm and a weight fraction of particles of 40 to 80 μm diameter of 75%, 10 parts by weight of a polyethylene powder having an average particle diameter of 15 μm and 3 parts by weight of 2.5-mm cut polyester fiber chips. The mixture was placed in a mold having a thickness of 2 mm and compression molded under a pressure of 2 kg/cm$^2$ and at 120° C.

The molded activated carbon plate thus obtained was tested for compressive strength, equilibrium adsorption and adsorption rate. The results are shown in Table 1.

Example 7

A mixture was prepared by blending well in a V-type blender 30 parts by weight of monodispersion zeolite particles A having a median particle size of 30 μm and a weight fraction of particles of 12 to 80 μm diameter of 80%, 70 parts by weight of monodispersion activated carbon particles B having a median particle size of 100 μm and a weight fraction of particles of 40 to 200 μm diameter of 75%, 10 parts by weight of a polyethylene powder having an average particle diameter of 20 μm and 2 parts by weight of 2-mm cut polypropylene fiber chips. The mixture was placed in a mold having a thickness of 2 mm and compression molded under a pressure of 2 kg/cm² and at 120° C.

The molded activated carbon plate thus obtained was tested for compressive strength, equilibrium adsorption and adsorption rate. The results are shown in Table 1.

Example 8

A mixture was prepared by blending well in a V-type blender 30 parts by weight of monodispersion activated carbon powder A having a median particle size of 10 μm and a weight fraction of particles of 5 to 30 μm diameter of 80%, 70 parts by weight of monodispersion zeolite particles B having a median particle size of 80 μm and a weight fraction of particles of 40 to 180 μm diameter of 75%, 10 parts by weight of a polyethylene powder having an average particle diameter of 15 μm and 3 parts by weight of 2.5-mm cut polypropylene fiber chips. The mixture was placed in a mold having a depth of 2 mm and compression molded under a pressure of 2 kg/cm² and at 120° C.

The molded activated carbon plate thus obtained was tested for compressive strength, equilibrium adsorption and adsorption rate. The results are shown in Table 1.

Comparative Example 5

Example 9 was repeated except for using polyethylene particles having a median particle diameter of 120 μm, to mold a blade. While the blade showed nearly the same benzene adsorbability, its compressive strength was a decreased value of 3.7 kg/cm².

Comparative Example 6

Example 9 was repeated except for using 20 parts by weight (solid) of a polyvinyl acetate emulsion instead of the polyethylene particles, to mold a blade. The blade had a benzene adsorbability of 32 wt % and a compressive strength of 0.1 kg/cm².

Fans equipped with the blades obtained in Example 9 and Comparative Examples 5 and 6 were each placed in a box having a volume of 1 m³. The boxes were each filled with 5 g of benzene gas and time-dependent of benzene concentration with the running time of the fans were determined. The results are shown in FIG. 1. The blade obtained in Comparative Example 6 broke after 5 minutes' running.

Example 10

A mixture of 20 parts by weight of polypropylene particles having a median diameter of 10 μm, 50 parts by weight of zeolite particles having a median diameter of 10 μm, 50 parts by weight of activated carbon powder having a median particle diameter of 5 μm and 5

TABLE 1

| | Mondispersed particles A | Median diameter of particles A | Amount of A used | Monodispersed particles B | Median diameter of particles B | Amount of B used | Reinforcing material | Binder | Amount of Binder |
|---|---|---|---|---|---|---|---|---|---|
| Ex. 5 | Activated carbon | 30 μm | 30 parts | Activated carbon | 100 μm | 70 parts | PET fiber | PE | 10 parts |
| Ex. 6 | Activated carbon | 10 μm | 30 parts | Activated carbon | 80 μm | 70 parts | PET fiber | PE | 10 parts |
| Ex. 7 | Zeolite | 30 μm | 30 parts | Activated carbon | 100 μm | 70 parts | PP fiber | PE | 10 parts |
| Ex. 8 | Activated carbon | 30 μm | 30 parts | Zeolite | 80 μm | 70 parts | PP fiber | PE | 10 parts |

| | Molding pressure | Strength of molded article | Benzene adsorbability | Rate of benzene adsorption | Ammonia adsorption | Rate of ammonia adsorption |
|---|---|---|---|---|---|---|
| Ex. 5 | 2 kg/cm² | 5 kg/cm² | 30% | 23% | — | — |
| Ex. 6 | 2 kg/cm² | 5 kg/cm² | 30% | 23% | 3% | 2.8% |
| Ex. 7 | 0.5 kg/cm² | 12 kg/cm² | 14% | 12% | 3% | 2.8% |
| Ex. 8 | 2 kg/cm² | 13 kg/cm² | 7% | 6% | 2% | 2% |

1) The strength of a molded article means the load required for compressive failure of the article.
2) The benzene adsorbability was measured according to JIS(1/n = 1/10).
3) The adsorption rates are expressed by a weight increase of a specimen having been allowed to stand for 5 minutes in a dessicator containing benzene vapor under saturated pressure.
4) PET, PP and PE stand for polyethylene terephthalate, polypropylene and polyethylene respectively.

Example 9

A mixture of 20 parts by weight of polyethylene particles having a median particle diameter of 20 μm, 3 parts by weight of glass fiber having a length of 3 mm and 100 parts by weight of coconut-shell activated carbon was agitated for 10 minutes in a mixer.

The mixture was flown into a mold having a shape of a propeller-type blade with a diameter of 30 cm, and compression molded therein for 30 minutes at 100° C. and under a pressure of 10 kg/cm².

The blade thus obtained weighed 250 g, including 208 g of the activated carbon. The blade showed a benzene adsorbability of 38 wt % and a compressive strength of 5 kg/cm².

parts by weight of 3-m cut chips of a conjugate fiber comprising a core of polypropylene and a sheath of polyethylene was prepared in a mixer and transferred to a ball mill, where the mixture was stirred for 60 minutes. The blend thus obtained was flown into a mold having a size of 300 mm × 300 mm × 1.5 mm and molded at 120° C. under a pressure of 2 kg/cm² for 30 minutes.

After being allowed to cool, the molded plate was taken out and cut into strips having a width of 20 mm. A sirocco fan was fabricated using the strips. The sirocco fan weighed 200 g, in which zeolite and activated carbon weighed both 83 g.

The sirocco fan showed an ammonia adsorption, benzene adsorption and compressive strength of 13 wt %, 28 wt % and 5 kg/cm², respectively.

Comparative Example 7

Example 10 was repeated except that 60 parts by weight of polyethylene particles having a median diameter of 10 μm was mixed instead of the 20 parts by weight of the polypropylene particles, to obtain a sirocco fan. Although the sirocco fan thus obtained showed an increased compressive strength of 8 kg/cm², it showed decreased values of ammnonia adsorption and benzene adsorption of 9.9 wt % and 21.2 wt % respectively.

Comparative Example 8

Example 10 was repeated except that 20 parts by weight (solid) of polyvinyl chloride emulsion was used instead of the 20 parts by weight of the polypropylene particles, to obtain a sirocco fan. The fan thus obtained showed an ammonia adsorption, benzene adsorption and compressive strength of 8 wt %, 21 wt % and 0.2 kg/cm², respectively.

The sirocco fans obtained in Example 10 and Comparative Examples 7 and 8 were each placed in a box having a volume of 1 m³. The boxes were filled with cigarette smoke and the fans were run for 3 minutes. After the running, the concentrations of hydrogen sulfide, ammonia and hydrocarbons in the boxes were determined.

The results are shown in Table 2.

TABLE 2

| | Example 10 | Comparative Example 7 | Comparative Example 8 |
|---|---|---|---|
| Amount of activated carbon g | 83 | 62 | 56 |
| Amount of zeolite g | 83 | 62 | 56 |
| Pressure loss mmaq | 0 | 0 | 0 |
| Concentration after treatment of 10-pcs-cigarettes' smoke | | | |
| H₂S ppm | 0 | 0 | 0 |
| NH₃ ppm | 0 | 0 | 0 |
| H.C. ppm | 0 | 0 | 0 |
| Concentration after treatment of 100-pcs-cigarettes' smoke | | | |
| H₂S ppm | 0.23 | 1.96 | 1.78 |
| NH₃ ppm | 0.18 | 1.85 | 1.68 |
| H.C. ppm | 0.10 | 1.13 | 1.03 |
| Concentration after treatment of 1000-pcs-cigarettes' smoke | | | |
| H₂S ppm | 3.76 | 96.3 | 87.5 |
| NH₃ ppm | 3.01 | 83.7 | 76.1 |
| H.C. ppm | 2.46 | 65.8 | 59.8 |

Note:
H.C. stands for hydrocarbon

Example 11

Figure 2B:
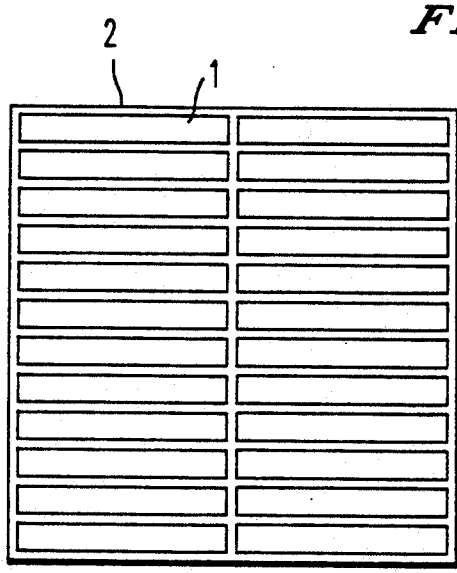
Figure 2C:
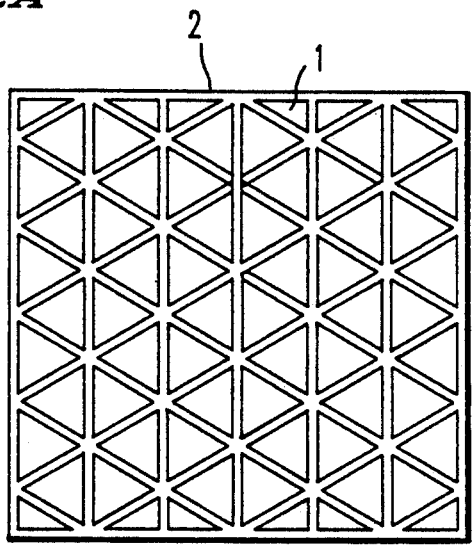
Figure 2D:
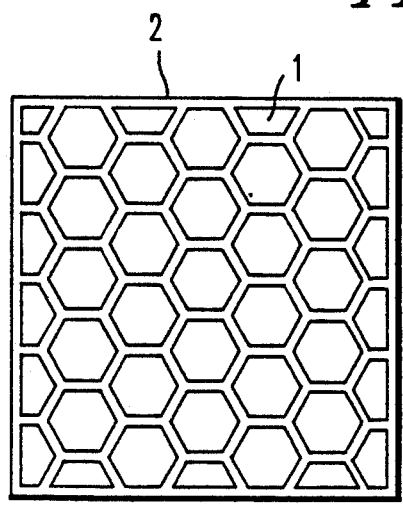

A mixture of 100 parts by weight of activated carbon particles having a median diameter of 30 μm, 15 parts by weight of polyethylene powder having a median particle diameter of 20 μm and 2 parts by weight of polypropylene fiber chips having a diameter and length of 10 μm and 2 mm respectively was blended well in a V-type blender. The blend was then poured into honeycomb molds with 25 cells/inch² and having a thickness of 5 mm and molded at 120° C. under a pressure of 2 kg/cm² to give honeycomb moldings. The honeycomb moldings thus obtained had shapes as shown in FIG. 2.

The molded activated carbon having a honeycomb shape A in FIG. 2 showed a strength in a direction perpendicular to the honeycomb holes of 12 kg/cm² and a benzene adsorption of 38.9 wt %.

Comparative Example 9

Example 11 was repeated except for using as binder polyethylene particles having a median diameter of 100 μm instead of the polyethylene particles having a median diameter of 10 μm, to mold honeycomb moldings.

The molded activated carbon having a honeycomb shape A in FIG. 2 showed a strength in a direction perpendicular to the honeycomb holes of 1.3 kg/cm² and a benzene adsorption of 31.2 wt %.

Obviously, numerous modifications and variations of the present invention are possible in light of the above teachings. It is therefore to be understood that within the scope of the appended claims, the invention may be practiced otherwise than as specifically described herein.

What is claimed is:

1. A blade for propeller fans or sirocco fans, of molded adsorbent comprising a mixture of (1) adsorbent particles wherein said adsorbent particles are of at least one member selected from the group consisting of activated carbon, zeolite and silica; (2) fine plastic particles wherein said fine plastic particles are of at least one member selected from the group consisting of polyethylene, polypropylene, and ethylene-vinyl acetate copolymer, a major portion of said fine plastic particles having a particle diameter of 0.5 to 100 μm, and of a blended ratio of 1 to 50 parts by weight based on 100 parts by weight of the adsorbent particles; and (3) a reinforcing fiber, said mixture being consolidated by said fine plastic particles and part of said reinforcing fiber being fused, to act as a binder.

2. A blade for propeller fans or sirocco fans according to claim 1, wherein said reinforcing fiber is selected from the group consisting of polyethylene terephthalate, polybutylene terephthalate, nylon, polyvinyl alcohol, Kevlar ®, polyethylene, polypropylene, conjugate fibers consisting of at least two materials selected from the group consisting of polyethylene terephthalate, polybutylene terephthalate, nylon, polyvinyl alcohol, Kevlar ®, polyethylene and polypropylene, and glass fibers and has a form of short-cut individual filaments, chopped strands, endless yarns or rovings, a nonwoven, woven or knitted fabric or a net.

* * * * *